United States Patent Office 2,865,895
Patented Dec. 23, 1958

2,865,895

IMPROVEMENT FOR THE PREPARATION OF POLYAMIDES

Josef Heinrich Fritz Pieper, Berlin-Lichterfelde, and Johanna Elisabeth Viktoria Natalie Stauch, Berlin-Schlachtensee, Germany, assignors, by mesne assignments, to Hercules Powder Company, Wilmington, Del., a corporation of Delaware No Drawing. Application July 6, 1955
Serial No. 520,352

Claims priority, application Germany November 17, 1954

3 Claims. (Cl. 260—78)

This invention relates to a process for the preparation of high molecular polycondensates and more particularly to the preparation of high molecular polyamides.

Polyamides are formed from polyamide-forming lactams and ω-amino carboxylic acids with or without the use of pressure, provided the monomers are heated, in the presence of catalysts, if necessary, to polyamide-producing temperatures. As the degree of polymerization increases, the melt becomes more viscous. Owing to the poor heat conductivity of the melt, there is danger of formation, to a considerable extent, of low and high molecular weight portions, if the melt is not sufficiently well mixed, for example, by means of stirring apparatus or with the use of a method operating on the principle of thin-layer polymerization. It is impossible to obtain homogeneous polymerization even with the taking of these special measures, since low molecular portions are always present. However, a uniform composition of the final product such as was mentioned above is desirable, because many of the polymer properties are directly or indirectly related therewith.

In accordance with this invention, it has now been found that a uniform polymer and an improvement in the properties of the final product are obtained when the polymerization is conducted in two stages. In carrying out such a process it is necessary to prepare a prepolymer in the melt by the methods known to the prior art and further polymerizing it, after adequate and uniform comminution in liquids which are nondissolving and inert toward the polyamide, at temperatures below the melting point of the polyamide. This secondary polymerization in the solid phase results in the formation of water, which must be continuously removed from the system. The polymerization is complete when water is no longer separated. After separation of the inert liquid adhering to the polymer there is produced a high molecular polyamide which, because of its specific properties, is particularly well suited for the preparation of molded articles. It is significant that the monomer content of such high molecular polyamides is very low, so that there is practically no low molecular portion and the polymer is, therefore, more homogeneous.

Waste products may also be used as a prepolymer. In this case it is advantageous to dissolve the substance in the known solvents, e. g., formic acid and so forth, and to precipitate it with a nonsolvent. In this way there are obtained powder-form polyamides which are especially well suited for secondary polymerization by the aforementioned methods. However, care should be taken that the powder-form products have a water content of less than 1% before conducting the secondary polymerization in inert liquids.

It is also possible to effect mechanical comminution of the prepolymers for the purpose of preparing high molecular products according to the previously mentioned method. In this case a particle size of 5 mm. should not be exceeded. Moreover, the size of the particles should not differ too much.

Examples of liquids for carrying out the secondary polymerization of polyamides according to the aforementioned method are high-boiling cyclic hydrocarbons, e. g., decalin or tetralin. These liquids must be free of low- and high-boiling fractions, since such compounds readily produce discoloration of the polymer. It is important that, when other liquids than the above-mentioned ones are employed, they exert no dissolving or swelling action on the polyamide at the temperatures used. The most advantageous boiling temperatures for such inert liquids lie between 180 and 210° C.

In connection with carrying out the process of the invention, it is important always to operate at the boiling points of the inert liquids. This leads to a satisfactory constancy of the temperature and prevents partial superheating, which, in turn, may result in a non-homogeneous polymer. It is advantageous to operate with refluxing. Since the liquid vapor provides adequate protection from the air, the polymerizations may also be conducted in the absence of nitrogen. In every case, the water liberated during the polycondensation must be removed.

To obtain a definite degree of polymerization it is necessary, when different prepolymers are used, to add stabilizers to the inert liquid before the polymerization begins. These additives may be acids or bases, but should, in any event, be soluble in the inert liquid at the polymerization temperature. It is also possible, instead of using such additives, to conduct the polymerization in the presence of a current of ammonia.

Other substances, e. g., heat-resistant dyes and plasticizers, may be added to the liquid, instead of stabilizers, before the polymerization begins.

When the polymerization is ended, the high molecular polyamide is completely freed of adhering inert liquid. In the dry form, it is exceptionally suitable as a molding powder.

Example 1

A prepolymer of 70% ε-caprolactum and 30% ε-amino caproic acid with a relative viscosity of 1.5 and an extractables content of 13% is mechanically divided to a uniform particle size. One part by weight of these granules is refluxed with five parts by weight of tetralin (boiling point 206–208° C.) for 20 hours with agitation. The water set free in this reaction is continuously removed from the system by way of the water separator. After the polymerization time is over, the polymer is separated from the tetralin. The tetralin which still adheres to the polymer is removed by steam treatment and the polymer is then dried in vacuum at 60° C. After drying, a polymer with a relative viscosity of 3.2 and an extractables content of less than 1% is obtained.

Example 2

One part by weight of the prepolymer prepared according to Example 1 is refluxed with 5 parts by weight of decalin (boiling point 186° C.) for 25 hours with agitation. The water set free in this reaction is continuously removed from the system by the water separator. After the polymerization time is over, the polymer is removed from the decalin. The decalin still adhering to the polymer is removed by treatment with steam. The polymer is dried in a vacuum at 60° C. The relative viscosity of the polymer so obtained amounts to 2.8 with an extractables content of less than 1%.

Example 3

One part by weight of a commercial granulated polymer based on caprolactam with a relative viscosity of 2.28 and an extractables content of 8% is refluxed with 5 parts by weight of tetralin for 15 hours with agitation. The water set free in this reaction is removed from the reaction mixture as indicated in Examples 1 and 2. After the polymerization time is over, the tetralin, as described in Example 1, is removed from the polymer. The result, after the polymer is dried in a vacuum, is a product with a relative viscosity of 2.9 and an extractables content of less than 1%.

*Example 4*

One part by weight of the polymer cited in Example 3 is refluxed with 5 parts by weight of tetralin with the addition of 0.17% of enanthic acid for 15 hours with agitation. Further processing of the polymer is carried out as described in Examples 1–3. The result is a product with a relative viscosity of 2.5 and an extractables content of less than 1%.

*Example 5*

The operation was carried out as in Example 4. Instead of enanthic acid, 0.17% of valerolactone is added to the tetralin. Under these conditions, the result is a polymer with a relative viscosity of 2.0 and an extractables content of less than 1%.

*Example 6*

One part by weight of the prepolymer prepared and granulated according to Example 1 and having a relative viscosity of 1.5 and an extractables content of 13% is refluxed with 5 parts by weight of tetralin for 10 hours at the boiling point of tetralin with agitation and with the simultaneous introduction of ammonia. The water formed in this reaction is removed from the system by the water separator. After the polymerization time is over, the processing is carried out as described in Examples 1–5. The result is an end-product polymer with a relative viscosity of 2.4 and an extractables content of less than 2%.

The high molecular polyamide products obtained in accordance with this invention may be utilized for the production of films, sheets, filaments, coatings, and the like and are particularly well suited for the preparation of molded articles.

What we claim and desire to protect by Letters Patent is:

1. In a process for preparing polyamide from prepolymer of polyamide-forming lactams and ω-aminocarboxylic acids to form a solid polymer having increased relative viscosity, the improvement comprising subjecting said prepolymer in finely divided form to solid phase polymerization at temperatures below the melting point of said polyamide in an inert cyclic hydrocarbon having a boiling temperature between 180° and 210° C. and at the boiling temperature of said inert cyclic hydrocarbon while continuously removing water formed until water is no longer separated and the polymerization is substantially completed, said inert cyclic hydrocarbon being a nonsolvent for said polyamide and said prepolymer having a particle size of not more than 5 mm., separating the inert cyclic hydrocarbon from the resulting product, removing inert cyclic hydrocarbon still adhering to said resulting product and recovering a uniform polyamide having increased relative viscosity.

2. The process in accordance with claim 1 in which the inert cyclic hydrocarbon is decalin.

3. The process in accordance with claim 1 in which the inert cyclic hydrocarbon is tetralin.

References Cited in the file of this patent

UNITED STATES PATENTS

| 2,172,374 | Flory | Sept. 12, 1939 |
| 2,174,527 | Petersen | Oct. 3, 1939 |
| 2,190,770 | Carothers | Feb. 20, 1940 |
| 2,466,854 | Koch | Apr. 12, 1949 |
| 2,596,272 | Moravec | May 13, 1952 |

FOREIGN PATENTS

| 263,292 | Switzerland | Nov. 16, 1949 |

OTHER REFERENCES

"Handbooks of Chemistry and Physics," pages 924–927, 30th edition (1947), Chemical Rubber Publishing Co., Cleveland, Ohio.